US012716756B2

(12) United States Patent
Murray et al.

(10) Patent No.: US 12,716,756 B2
(45) Date of Patent: Aug. 25, 2026

(54) BRILLOUIN SENSING USING POLARIZATION PULLING

(71) Applicant: The Government of the United States of America, as represented by the Secretary of the Navy, Arlington, VA (US)

(72) Inventors: Joseph B. Murray, Ellicot City, MD (US); Brandon Redding, University Park, MD (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 133 days.

(21) Appl. No.: 18/136,256

(22) Filed: Apr. 18, 2023

(65) Prior Publication Data

US 2023/0332932 A1 Oct. 19, 2023

Related U.S. Application Data

(60) Provisional application No. 63/363,115, filed on Apr. 18, 2022.

(51) Int. Cl.
*G01D 5/353* (2006.01)
*G01K 11/322* (2021.01)

(52) U.S. Cl.
CPC ....... *G01D 5/35364* (2013.01); *G01K 11/322* (2021.01)

(58) Field of Classification Search
CPC ... G01D 5/35364; G01D 5/353; G01K 11/322
See application file for complete search history.

(56) References Cited

U.S. PATENT DOCUMENTS

2021/0148736 A1* 5/2021 Lee ...................... H01S 3/2375

FOREIGN PATENT DOCUMENTS

JP 2016148661 A * 8/2016

OTHER PUBLICATIONS

Wikipedia, article titled "Electro-optic modulator". Archived Feb. 23, 2021. (Year: 2021).*

(Continued)

*Primary Examiner* — Kara E. Geisel
*Assistant Examiner* — Paul Schnase
(74) *Attorney, Agent, or Firm* — US Naval Research Laboratory; William P. Ladd

(57) ABSTRACT

Systems and methods are provided for enabling improved sensitivity in low-gain regimes. Embodiments of the present disclosure use polarization pulling to separate a signal of interest (e.g., amplified probe light) from the background probe light. This enables a dramatic increase in probe power and thereby increases the signal-to-noise ratio of the measurement. Embodiments of the present disclosure provide a vector subtraction technique to compensate for undesirable interference effects resulting from the finite extinction of standard polarization components (i.e. polarizing beam splitters) and polarization fluctuations. Embodiments of the present disclosure enable Brillouin sensing with improved accuracy in low-gain regimes and is particularly relevant for high-spatial resolution sensing applications.

20 Claims, 4 Drawing Sheets

(56) References Cited

OTHER PUBLICATIONS

Remer, I., Shaashoua, R., Shemesh, N. et al. High-sensitivity and high-specificity biomechanical imaging by stimulated Brillouin scattering microscopy. Nat Methods 17, 913â916 (2020). https://doi.org/10.1038/s41592-020-0882-0 (Year: 2020).*

R. Paschotta, article on 'optical modulators' in the Encyclopedia of Laser Physics and Technology, 1. edition Oct. 2008, Wiley-VCH, ISBN 978-3-527-40828-3. Version provided was archived from rp-photonics.com on Apr. 15, 2021. (Year: 2008).*

Machine translation of Hotate (Foreign Patent Document JP-2016148661-A) (Year: 2016).*

R. Paschotta, article on 'optical modulators' in the Encyclopedia of Laser Physics and Technology, 1. edition Oct. 2008, Wiley-VCH, ISBN 978-3-527-40828-3. Version provided was archived from rp-photonics.com on Apr. 15, 2021. (Year: 2021).*

Newport; Article "Technical Note: Electro-Optic Modulator FAQs"; as archived on May 21, 2020. (Year: 2020).*

Remer, I., Shaashoua, R., Shemesh, N. et al. High-sensitivity and high-specificity biomechanical imaging by stimulated Brillouin scattering microscopy. Nat Methods (2020). https://doi.org/10.1038/s41592-020-0882-0 (Year: 2020).*

R. Paschotta, article on 'optical heterodyne detection' in the Encyclopedia of Laser Physics and Technology, 1. edition Oct. 2008, Wiley-VCH, ISBN 978-3-527-40828-3. Version provided was archived from rp-photonics.com on Mar. 22, 2021. (Year: 2021).*

Stefan Preussler, Avi Zadok, Andrzej Wiatrek, Moshe Tur, and Thomas Schneider, "Enhancement of spectral resolution and optical rejection ratio of Brillouin optical spectral analysis using polarization pulling," Opt. Express 20, 14734-14745 (Year: 2012).*

* cited by examiner

BRILLOUIN SENSING USING POLARIZATION PULLING

CROSS REFERENCE TO RELATED APPLICATIONS

This application claims the benefit of U.S. Provisional Patent Application No. 63/363,115 filed on Apr. 18, 2022, which is incorporated by reference herein in its entirety.

FEDERALLY SPONSORED RESEARCH AND DEVELOPMENT

The United States Government has ownership rights in this invention. Licensing inquiries may be directed to Office of Technology Transfer at US Naval Research Laboratory, Code 1004, Washington, DC 20375, USA; +1.202.767.7230; techtran@nrl.navy.mil, referencing Navy Case Number 211040-US2.

FIELD OF THE DISCLOSURE

This disclosure relates to sensors, including optical sensors.

BACKGROUND

Brillouin scattering based optical sensors operate by measuring the Brillouin frequency shift in a material of interest. The Brillouin frequency shift is proportional to the speed of sound in a material, which in turn depends on a number of physical parameters such as the temperature, strain, and mechanical properties of that material. As a result, Brillouin based sensors are used to identify different materials or to measure parameters such as temperature or strain.

One of the main limitations with existing Brillouin sensors is the difficulty in achieving high spatial resolution (i.e., measuring the Brillouin frequency in a small volume). This is particularly relevant for Brillouin microscopy as well as high-spatial resolution fiber sensing applications. In this regime, the small probe volume limits the strength of the Brillouin interaction (quantified in terms of the Brillouin "gain") and extensive averaging is required to obtain a measurement. Existing Brillouin sensors require extensive averaging due to the low signal-to-noise ratio associated with measuring low gain.

BRIEF DESCRIPTION OF THE DRAWINGS/FIGURES

The accompanying drawings, which are incorporated in and constitute part of the specification, illustrate embodiments of the disclosure and, together with the general description given above and the detailed descriptions of embodiments given below, serve to explain the principles of the present disclosure. In the drawings.

Figure 1:
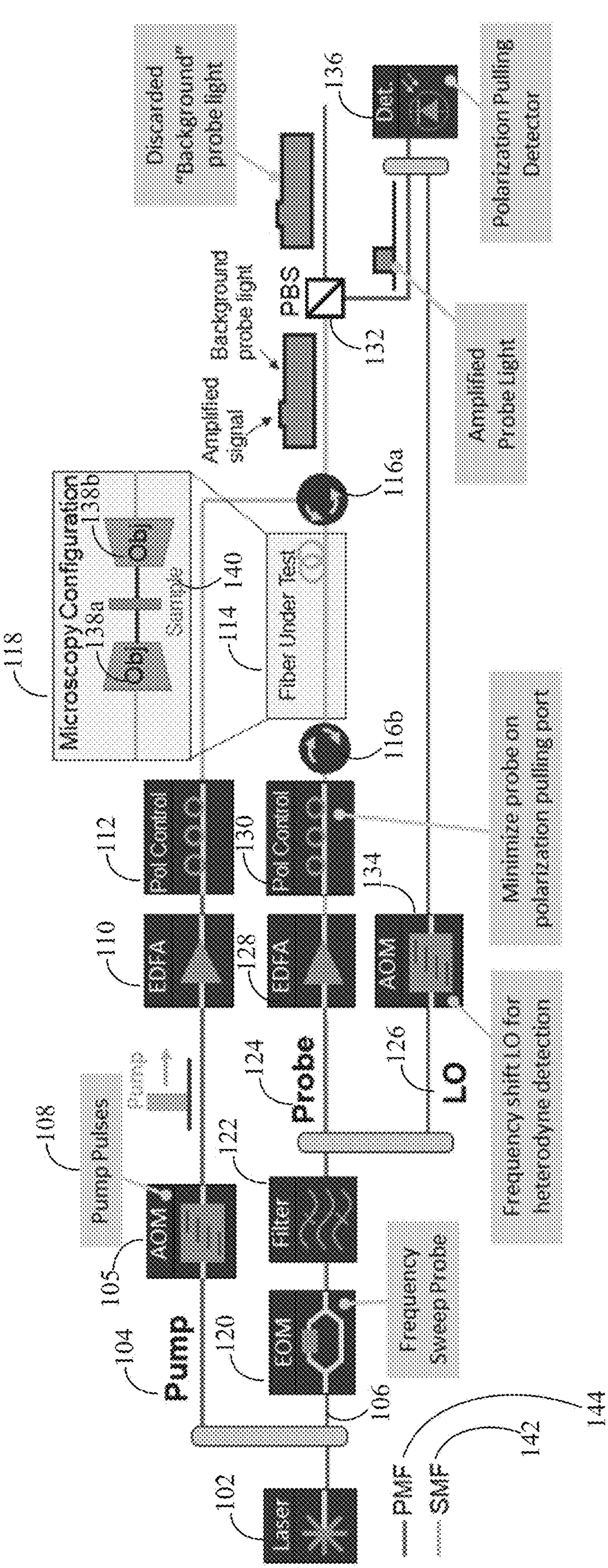
FIG. 1 is a diagram showing an exemplary polarization pulling sensor in accordance with an embodiment of the present disclosure.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

In the following description, numerous specific details are set forth to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to understand that such description(s) can affect such feature, structure, or characteristic in connection with other embodiments whether or not explicitly described.

1. Overview

Embodiments of the present disclosure provide systems and methods for enabling improved sensitivity in low-gain regimes. Embodiments of the present disclosure use polarization pulling to separate a signal of interest (e.g., amplified probe light) from the background probe light. This enables a dramatic increase in probe power and thereby increases the signal-to-noise ratio of the measurement. Embodiments of the present disclosure provide a vector subtraction technique to compensate for undesirable interference effects resulting from the finite extinction of standard polarization components (i.e., polarizing beam splitters) and polarization fluctuations. Embodiments of the present disclosure enable Brillouin sensing with improved accuracy in low-gain regimes and is particularly relevant for high-spatial resolution sensing applications.

2. Brillouin Sensors

Fiber optic strain sensors can be used as a tool for a wide range of sensing applications including perimeter security, structural health monitoring, and pipeline monitoring. Brillouin based fiber optic sensors can be attractive due to their ability to achieve long-range, high spatial resolution, and large dynamic range in standard telecom fiber. In addition, Brillouin based sensors can measure the absolute strain, which can be crucial for applications such as structural health monitoring.

However, the accuracy of these sensors can depend on the strength of the Brillouin interaction, which scales with the length of the interaction volume. This can limit the accuracy of high spatial resolution Brillouin fiber sensing techniques such as Brillouin optical coherence domain analysis (BOCDA). Brillouin microscopy can suffer from the same limitation. The inherently small interaction volume combined with strict damage threshold limitations on the pump power can result in very low Brillouin gain (typically $\sim 10^{-4}$) in stimulated Brillouin microscopy applications.

Embodiments of the present disclosure provide systems and methods that enable accurate Brillouin measurements in the low-gain regime. Embodiments of the present disclosure use a stimulated Brillouin scattering (SBS) sensor that uses the polarization pulling effect to separate the amplified probe light from the background probe light.

Embodiments of the present disclosure can use polarization pulling to separate the amplified probe light from the background probe light, which provides a sensitivity improvement. Embodiments of the present disclosure use polarization pulling to isolate the signal of interest (e.g., the amplified Brillouin probe light) for Brillouin sensing applications in the low-gain (high-spatial resolution) regime.

3. Exemplary Polarization Pulling Sensor

FIG. 1 is a diagram showing an exemplary polarization pulling sensor in accordance with an embodiment of the present disclosure. In an embodiment, this system can be used for fiber optic Brillouin sensing (e.g., to probe a filter under test) or Brillouin microscopy. In FIG. 1, a laser 102 is used to seed the pump 104 and probe 106 paths. In FIG. 1, along the pump path 104, an acousto-optic modulator (AOM) 105 is used to carve pump pulses 108. In FIG. 1, an Erbium-doped fiber amplifier (EDFA) 110 is then used to amplify the pump pulses, which are passed through a polarization controller 112 before entering the fiber under test (FUT) 114 through a circulator 116*a*. As shown in FIG. 1, in an embodiment, the fiber under test 114 can be used for microscopy, such as Brillouin microscopy, using a microscopy apparatus 118.

In FIG. 1, along the probe path 106, the light is first shifted by an electro-optic modulator (EOM) 120 to produce sidebands shifted by approximately the Brillouin frequency. In FIG. 1, a narrowband filter 122 is then used to select the lower frequency sideband, and the frequency-shifted light is then divided into a probe beam 124 and a local oscillator (LO) 126. In FIG. 1, along the probe path 124, the light is amplified (e.g., by EFDA 128) and directed through a polarization controller 130 before passing through the FUT 114 via a circulator 116*b*.

In FIG. 1, after leaving the FUT 114, the probe light is directed to a polarizing beam splitter (PBS) 132. In an embodiment, the polarization controller 130 on the probe-side should be adjusted to minimize the reflected light at the PBS, thereby discarding most of the probe light in the absence of an SBS interaction. In an embodiment, when the probe interacts with the pump, polarization pulling rotates the polarization of the amplified probe light. In an embodiment, the polarization controller 112 on the pump side should be adjusted to maximize the probe light reflected at the PBS 132 (i.e., to maximize the polarization pulling effect). In FIG. 1, the polarization pulled component of the probe light is combined with the LO 126, which is frequency shifted using an AOM 134 to enable heterodyne detection of the amplitude and phase of the probe light.

In an embodiment, to measure the Brillouin frequency, the amplitude of the interference signal recorded on the polarization pulling detector 136 is recorded as a function of the probe frequency, providing a measurement of the Brillouin gain spectrum. The center of the gain spectrum can then be estimated to provide a measurement of the Brillouin frequency in the fiber or sample under test.

In an embodiment, as shown in FIG. 1, single mode fibers (SMF) 142 are used in FIG. 1 to couple the polarization controller 112 to the circulator 116*a*, to couple the circulator 116*a* to PBS 132, to couple the EFDA 128 to polarization controller 130, to couple polarization controller 130 to the circulator 116*b*, and for connections within FUT 114 and microscopy apparatus 118. In an embodiment, polarization maintaining fibers (PMF) 144 are used for other connections shown in FIG. 1. However, it should be understood that these fibers shown in FIG. 1 are provided by way of example and are not limiting and that other fiber types and/or connections can be used in accordance with embodiments of the present disclosure.

Elements shown in FIG. 1 can be implemented using hardware, software, and/or a combination of hardware and software. Elements shown in FIG. 1 can be implemented using a single device or separate devices. Elements shown in FIG. 1 can be implemented as a standalone device (e.g., a standalone special purpose device) or can be integrated into a host device. Further, elements shown in FIG. 1 are provided by way of example and are not limiting, and some embodiments of the present disclosure may have some or all of the components shown in FIG. 1. For example, in an embodiment, other types of modulators can be used in place of the AOMs and EOMs shown in FIG. 1, other types of amplifiers can be used in place of the EDFA shown in FIG. 1, and other types of beam splitters can be used in place of the PBS of FIG. 1.

4. I/Q Demodulation

In the low-gain regime, the finite extinction of the PBS 132 (or drift of the probe polarization state) could corrupt the measurement scheme described above. In reality, the reflected probe light reaching the detector includes a combination of the Brillouin amplified light and the "bleed through" due to the imperfect extinction of the PBS 132. In general, these two fields will interfere, which could distort the measurement, particularly if the magnitude of the "bleed through" light is comparable to or greater than the magnitude of the "polarization pulled" light. In an embodiment, to compensate for this effect, I/Q demodulation can be used to measure the complex field with and without the Brillouin interaction (i.e., while the pump pulse is present, and after the pump pulse has left the fiber or sample under test).

In an embodiment, the amplitude of the SBS amplified probe light can be estimated as: $A_{SBS}=(I_{SBS}-I_{ref})+i(Q_{SBS}-Q_{ref})$, where $I_{SBS}$ is the real part of the field when the SBS pump was present, $I_{ref}$ is the real part of the field without the pump, $Q_{SBS}$ is the imaginary part of the field when the SBS pump was present, and $Q_{ref}$ is the imaginary part of the field without the pump. In an embodiment, this technique allows the sensor to operate at low gain using finite extinction polarization components. In an embodiment, using heterodyne detection can have additional benefits, since a strong LO can help to minimize photodetector and analog-to-digital (ADC) noise.

In an embodiment, the estimation of the amplitude of the SBS amplified probe light can be performed and/or stored in a variety of methods in accordance with embodiments of the present disclosure. For example, in an embodiment, FUT 114, microscopy apparatus 118, detector 136, an ADC coupled to detector 136, and/or a controller or host device coupled to the sensor of FIG. 1 can be configured to estimate the amplitude of the SBS amplified probe light (e.g., as $A_{SBS}=(I_{SBS}-I_{ref})+i(Q_{SBS}-Q_{ref})$) in accordance with embodiments of the present disclosure.

As shown in FIG. 1, the FUT 114 can be replaced with a microscopy apparatus 118. In this case, the fiber from the pump and probe sides can be directed through a pair of microscope objectives 138 and focused on the sample 140. The transmitted probe light can then be coupled back into fiber, and the rest of the sensor apparatus is unchanged. An advantage of this polarization pulling Brillouin sensor in accordance with an embodiment of the present disclosure is that the detector only measures the amplified probe light. In the low-gain regime, this allows for a significant increase in the probe power without saturating a photodetector or the analog to digital converter (ADC). In an embodiment, since the Brillouin gain is fixed by the pump, increasing the probe power will increase the power in the amplified signal reaching the detector and improve the signal-to-noise ratio of the measurement. In theory, increasing the probe power can fully compensate for reduced Brillouin gain—enabling high spatial resolution without compromising the accuracy of the sensor.

5. Exemplary Results

An exemplary embodiment of the sensor shown in FIG. 1 was constructed using a 10 m fiber under test. We then measured the uncertainty in the recovered Brillouin frequency at varying Brillouin gain (controlled by adjusting the pump power).

Figure 2:
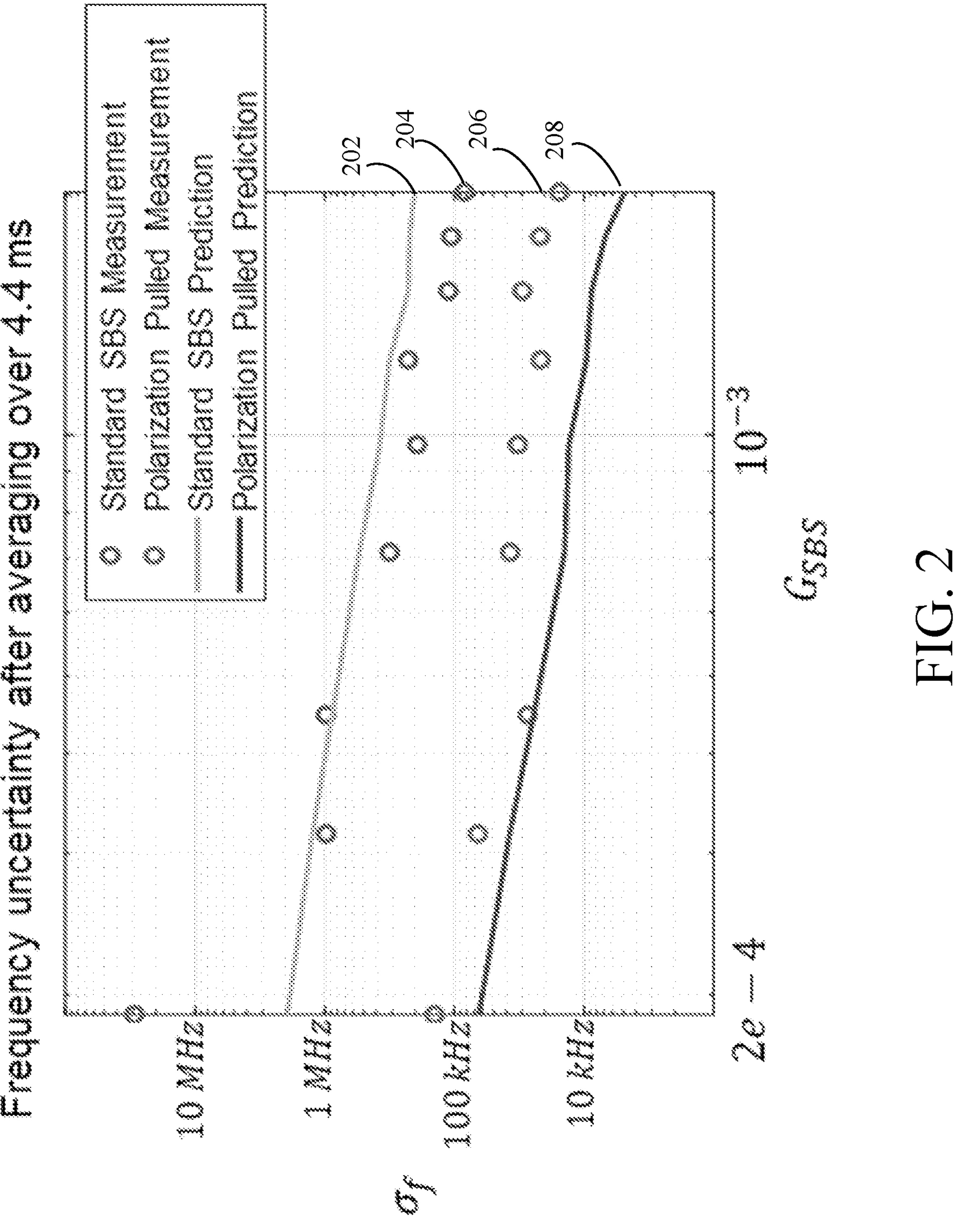
FIG. 2 is a diagram of the measured frequency uncertainty obtained using the polarization pulling Brillouin sensor compared with the frequency uncertainty obtained using a standard stimulated Brillouin scattering (SBS) sensor in accordance with an embodiment of the present disclosure.

FIG. 2 is a diagram of the measured frequency uncertainty obtained using the polarization pulling Brillouin sensor compared with the frequency uncertainty obtained using a standard SBS sensor (i.e., measured using a detector on the transmitted port of the PBS shown in FIG. 1) in accordance with an embodiment of the present disclosure. In FIG. 2, the upper line 202 plots a standard SBS prediction, and the upper dots 204 plot a standard SBS measurement. In FIG. 2, the lower line 208 plots a polarization pulled prediction, and the lower dots 206 plot a polarization pulled measurement.

Figure 3:
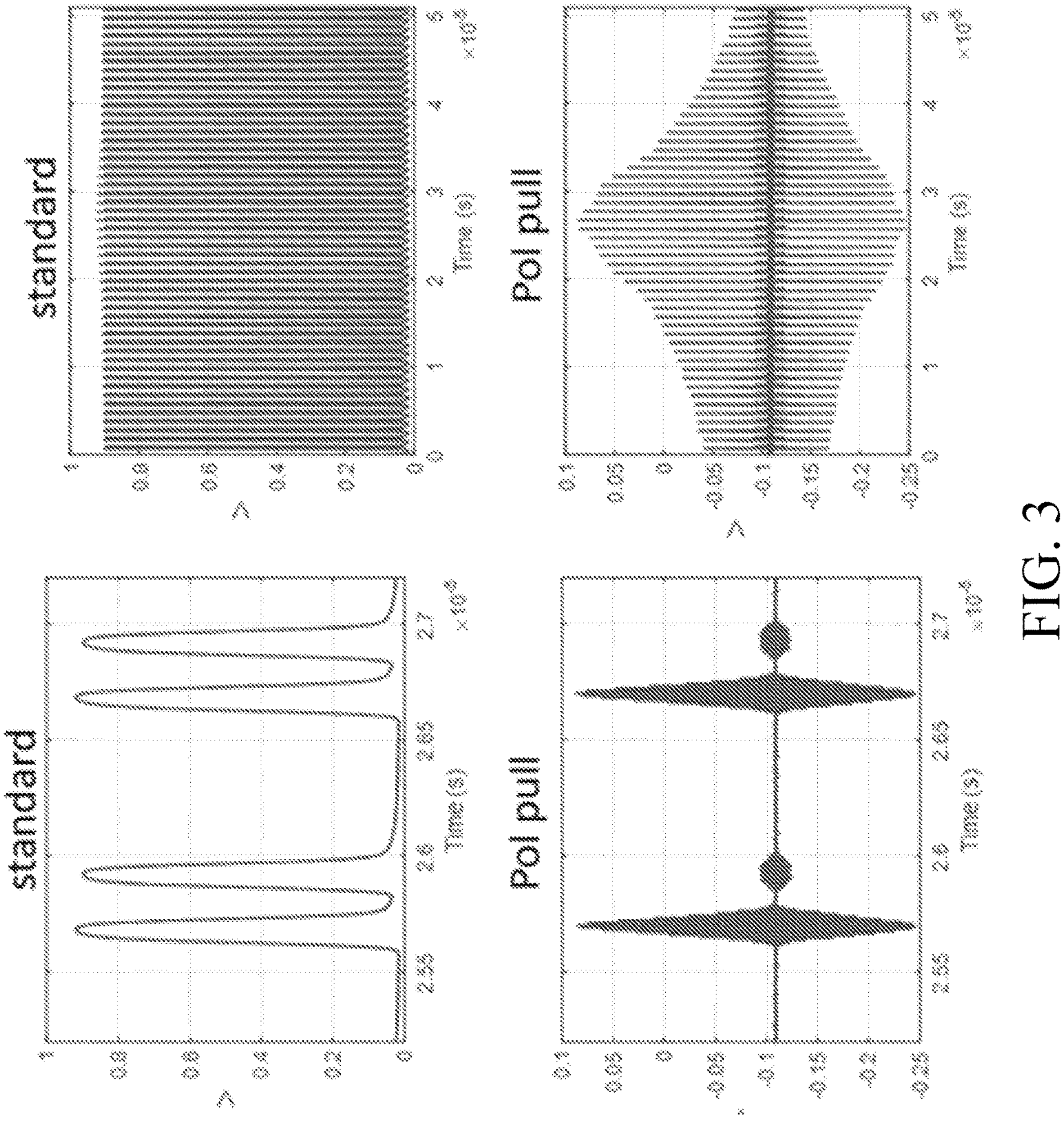
FIG. 3 is a diagram illustrating additional measurements vs. time for standard and polarization pulled embodiments.

FIG. 3 is a diagram illustrating additional measurements vs. time for standard and polarization pulled embodiments. The measurements illustrated by FIGS. 2 and 3 confirmed that at low gain ($<\sim 10^{-3}$), the polarization pulling scheme can provide substantial noise reduction. Furthermore, this initial demonstration was limited by components available in the laboratory, and we expect that an optimized system (e.g. using a higher gain photodetector and optimized EDFA) could provide even lower noise.

Figure 4:
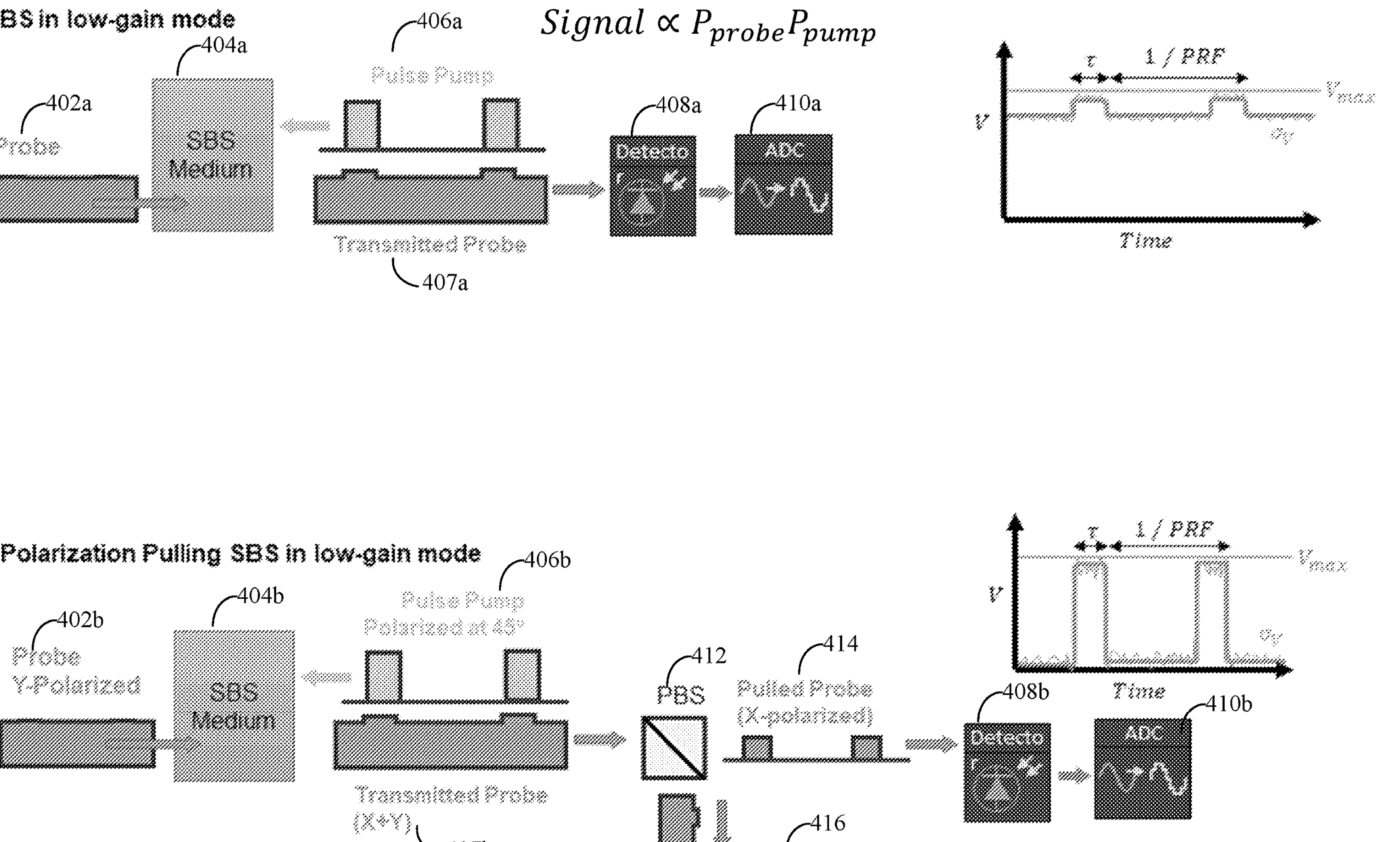
FIG. 4 shows diagrams illustrating an SBS sensor in low-gain mode and a polarization pulling SBS sensor in low-gain mode in accordance with embodiments of the present disclosure.

FIG. 4 shows diagrams illustrating an SBS sensor in low-gain mode and a polarization pulling SBS sensor in low-gain mode in accordance with embodiments of the present disclosure. In FIG. 4, for an SBS sensor in low-gain mode, a probe 402*a* is sent to a SBS medium 404*a* along with a pulse pump 406*a*, and a transmitted probe 407*a* is sent to a detector 408*a* (e.g., such as detector 136). As shown in FIG. 4, the output of the detector 408*a* can be converted to a digital format using analog-to-digital converter (ADC) 410*a*. In FIG. 4, for a polarization pulling SBS sensor in low-gain mode, a y-polarized probe 402*b* is sent to a SBS medium 404*b* along with a pulse pump 406*b* polarized (e.g., at 45°), and a transmitted probe 407*b* (X+Y) is sent to a PBS 412 (e.g., such as PBS 132). The PBS 412 splits the beam into a rejected probe 416 (e.g., y-polarized) and a puled probe 414 (e.g., x-polarized), which can be sent to a detector 408*b* (e.g., such as detector 136). As shown in FIG. 4, the output of the detector 408*b* can be converted to a digital format using analog-to-digital converter (ADC) 410*b*.

6. Exemplary Additional Embodiments

There are a few modifications to the basic architecture outlined in FIG. 1 which could be advantageous in some applications in accordance with embodiments of the present disclosure. For example, in an embodiment, the fiber optic components shown in FIG. 1 could be replaced with free-space counterparts (e.g., polarization control paddles could be replaced with waveplates, the fiber optic PBS could be replaced with a bulk optics PBS, fiber-coupled AOMs could be replaced with free-space AOMs, etc.).

For further example, in an embodiment, the probe beam could be pulsed to reduce the average power on the sample. For further example, in an embodiment, separate lasers could be used for the pump and probe, provided they have a known frequency offset.

In an embodiment, the LO is only required to compensate for insufficient extinction at the PBS. In an embodiment, if the PBS provides sufficient extinction, the LO path can be removed and the sensor could rely on direct detection of the amplified probe light.

This architecture is compatible with a variety of established methods to measure the Brillouin frequency, included slope-assisted, frequency scanning, or frequency comb-based techniques. It could also be used with various distributed sensing modalities including Brillouin optical time domain analysis (BOTDA) or Brillouin optical correlation domain analysis (BOCDA).

In an embodiment, the amplified probe light separated by the PBS could be further amplified with a final EDFA to reduce photodetector noise. In a distributed fiber sensing configuration, polarization diversity could be used to compensate for polarization fading along the fiber. In this case, the probe polarization would be set, as described above, to minimize the reflected light at the PBS. However, the pump pulse polarization could be modulated (scrambled or stepped through a series of predefined polarization states) to mitigate polarization fading.

In an embodiment, an active feedback loop could be used to control the probe polarization in order to continually minimize the reflected probe light. The approach presented here has improved sensitivity in the low-gain regime compared to other Brillouin sensing techniques. This is particularly relevant for high-spatial resolution Brillouin sensors, such as Brillouin microscopy or high-resolution distributed fiber sensors (e.g. BOCDA). In Brillouin microscopy, this could enable higher speed imaging by reducing the required averaging time. In fiber sensing applications, this could enable the measurement of dynamic (time-varying) signals by reducing the required averaging time.

7. Conclusion

It is to be appreciated that the Detailed Description, and not the Abstract, is intended to be used to interpret the claims. The Abstract may set forth one or more but not all exemplary embodiments of the present disclosure as contemplated by the inventor(s), and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Any representative signal processing functions described herein can be implemented using computer processors, computer logic, application specific integrated circuits (ASIC), digital signal processors, etc., as will be understood by those skilled in the art based on the discussion given herein. Accordingly, any processor that performs the signal processing functions described herein is within the scope and spirit of the present disclosure.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments.

What is claimed is:

1. A polarization pulling sensor configured to separate amplified probe light from background probe light, the polarization pulling sensor comprising:

- a first modulator configured to receive an optical beam and generate pump pulses;
- a first amplifier configured to:
  - receive the pump pulses from the first modulator, and
  - amplify the pump pulses;
- a second modulator configured to receive the optical beam and to produce a plurality of sidebands based on the optical beam, wherein the sidebands are shifted by approximately a Brillouin frequency;
- a filter configured to select a lower sideband in the plurality of sidebands, thereby producing a probe signal;
- a second amplifier configured to amplify the lower sideband, thereby generating an amplified lower sideband;
- a first polarization controller configured to receive the amplified pump pulses from the first amplifier;
- a second polarization controller configured to receive the amplified lower sideband from the second amplifier;
- a fiber under test (FUT) coupled to the first polarization controller and to the second polarization controller, wherein the FUT is configured to receive the amplified pump pulses generated by the first amplifier and the amplified lower sideband generated by the second amplifier;
- a beam splitter aligned to the second polarization controller, wherein the beam splitter is configured to receive the amplified lower sideband from the FUT, wherein the second polarization controller is adjusted to minimize light reflected at the beam splitter, thereby discarding most of the probe light in the absence of a stimulated Brillouin scattering (SBS) interaction;
- a third modulator configured to receive:
  - an oscillator signal, and
  - modulate the probe signal using the oscillator signal, thereby providing a modulated probe signal; and
- a polarization pulling detector configured to:
  - receive the amplified lower sideband and the modulated probe signal,
  - detect an interference signal, and
  - record an amplitude of the interference signal as a function of a probe frequency, thereby providing a measurement of a Brillouin gain spectrum, wherein a center of the Brillouin gain spectrum provides a measurement of a Brillouin frequency of the FUT.

2. The polarization pulling sensor of claim 1, wherein the first modulator and the third modulator are acousto-optic modulators (AOMs).

3. The polarization pulling sensor of claim 1, wherein the first amplifier and the second amplifier are Erbium-doped fiber amplifiers (EDFAs).

4. The polarization pulling sensor of claim 1, wherein the second modulator is an electro-optic modulator (BOM).

5. The polarization pulling sensor of claim 1, wherein the first polarization controller is adjusted to maximize probe light reflected at the beam splitter to maximize a polarization pulling effect.

6. The polarization pulling sensor of claim 1, further comprising:

- a first circulator configured to:
  - receive the amplified pump pulses from the first polarization controller,
  - pass the amplified pump pulses to the FUT,
  - receive the amplified lower sideband from the FUT, and
  - pass the amplified lower sideband to the beam splitter; and
- a second circulator configured to receive the amplified lower sideband from the second polarization controller and to pass the amplified lower sideband to the FUT.

7. The polarization pulling sensor of claim 1, wherein the beam splitter is a polarizing beam splitter (PBS).

8. The polarization pulling sensor of claim 1, wherein the detector is configured to record, based on the amplified pump pulses and the modulated lower sideband, an amplitude of an interference signal as a function of probe frequency, thereby providing a measurement of a Brillouin gain spectrum.

9. The polarization pulling sensor of claim 1, wherein the polarization pulling detector is further configured to detect an amplitude and phase of probe light in the probe signal using heterodyne detection based on the modulated probe signal.

10. The polarization pulling sensor of claim 1, wherein the amplitude of the interference signal can be estimated as $A_{SBS}=(I_{SBS}-I_{REF})+i(Q_{SBS}-Q_{REF})$, wherein SBS stands for stimulated Brillouin scattering, $I_{SBS}$ is the real part of a field when an SBS pump is present, $I_{REF}$ is the real part of the field without the pump, $Q_{SBS}$ is the imaginary part of the field when the SBS pump is present, and $Q_{REF}$ is the imaginary part of the field without the pump.

11. The polarization pulling sensor of claim 1, wherein the probe is y-polarized, wherein the beam splitter is further configured to split the amplified lower sideband into a y-polarized rejected probe and an x-polarized pulled probe, and wherein the polarization pulling detector is configured to receive the x-polarized pulled probe from the beam splitter.

12. The polarization pulling sensor of claim 1, further comprising:

a coupler coupled to respective outputs of the beam splitter and the third modulator and to an input of the polarization pulling detector, wherein the coupler is configured to combine the amplified lower sideband and the modulated probe signal into a combined signal.

13. The polarization pulling sensor of claim 12, wherein the polarization pulling detector is configured to:

receive the amplified lower sideband and the modulated probe signal in the combined signal; and detect the interference signal in the combined signal.

14. The polarization pulling sensor of claim 13, wherein the polarization pulling detector is configured to provide a vector subtraction technique to compensate for undesirable interference effects in the interference signal.

15. The polarization pulling sensor of claim 14, wherein the undesirable interference effects result from finite extinction of the beam splitter.

16. The polarization pulling sensor of claim 14, wherein the undesirable interference effects result from polarization fluctuations.

17. A polarization pulling sensor configured to separate amplified probe light from background probe light, the polarization pulling sensor comprising:

a first modulator configured to receive an optical beam and generate pump pulses;

a first amplifier configured to:

receive the pump pulses from the first modulator, and amplify the pump pulses;

a second modulator configured to receive the optical beam and to produce a plurality of sidebands based on the optical beam, wherein the sidebands are shifted by approximately a Brillouin frequency;

a filter configured to select a lower sideband in the plurality of sidebands, thereby producing a probe signal;

a second amplifier configured to amplify the lower sideband, thereby generating an amplified lower sideband;

a first polarization controller configured to receive the amplified pump pulses from the first amplifier;

a second polarization controller configured to receive the amplified lower sideband from the second amplifier;

a microscopy apparatus coupled to the first polarization controller and to the second polarization controller, wherein the microscopy apparatus is configured to receive the amplified pump pulses generated by the first amplifier and the amplified lower sideband generated by the second amplifier;

a beam splitter aligned to the second polarization controller, wherein the beam splitter is configured to receive the lower sideband from the microscopy apparatus, wherein the second polarization controller is adjusted to minimize light reflected at the beam splitter, thereby discarding most of the probe light in the absence of a stimulated Brillouin scattering (SBS) interaction;

a third modulator configured to receive:

an oscillator signal, and modulate the probe signal using the oscillator signal, thereby providing a modulated probe signal; and a polarization pulling detector configured to:

receive the amplified lower sideband and the modulated probe signal, detect an interference signal, and record an amplitude of the interference signal as a function of a probe frequency, thereby providing a measurement of a Brillouin gain spectrum, wherein a center of the Brillouin gain spectrum provides a measurement of a Brillouin frequency of the microscopy apparatus.

18. The polarization pulling sensor of claim 17, wherein the microscopy apparatus comprises:

a first microscope objective configured to receive the amplified pump pulses and to focus the amplified pump pulses on a sample; and a second microscope objective configured to receive the amplified lower sideband and to focus the amplified lower sideband on the sample.

19. The polarization pulling sensor of claim 17, further comprising:

a first circulator configured to:

receive the amplified pump pulses from the first polarization controller, pass the amplified pump pulses to the microscopy apparatus, receive the amplified lower sideband from the microscopy apparatus, and pass the amplified lower sideband to the beam splitter; and a second circulator configured to receive the amplified lower sideband from the second polarization controller and to pass the amplified lower sideband to the microscopy apparatus.

20. A polarization pulling sensor configured to separate amplified probe light from background probe light, the polarization pulling sensor comprising:

a first modulator configured to receive an optical beam and generate pump pulses;

a first amplifier configured to:

receive the pump pulses from the first modulator, and amplify the pump pulses;

a first polarization controller configured to receive the amplified pump pulses from the first amplifier;

a second modulator configured to receive the optical beam and to produce a plurality of sidebands based on the optical beam, wherein the sidebands are shifted by approximately a Brillouin frequency;

a filter configured to select a lower sideband in the plurality of sidebands, thereby producing a probe signal;

a second amplifier configured to amplify the lower sideband, thereby generating an amplified lower sideband;

a second polarization controller configured to receive the amplified lower sideband from the second amplifier;

a fiber under test (FUT) coupled to the first polarization controller and to the second polarization controller, wherein the FUT is configured to receive the amplified pump pulses from the first polarization controller and the amplified lower sideband from the second polarization controller;

a beam splitter aligned to the second polarization controller, wherein the beam splitter is configured to receive the amplified lower sideband from the FUT, wherein the first polarization controller is adjusted to maximize probe light reflected at the beam splitter to maximize a polarization pulling effect, and wherein the second polarization controller is adjusted to minimize light reflected at the beam splitter, thereby discarding most of the probe light in the absence of a stimulated Brillouin scattering (SBS) interaction;

a third modulator configured to receive:

an oscillator signal, and modulate the probe signal using the oscillator signal, thereby providing a modulated probe signal; and a polarization pulling detector configured to:

receive the amplified lower sideband and the modulated probe signal, detect an interference signal, and record an amplitude of the interference signal as a function of a probe frequency, thereby providing a measurement of a Brillouin gain spectrum, wherein a center of the Brillouin gain spectrum provides a measurement of a Brillouin frequency of the FUT.

* * * * *